(12) United States Patent
Yang et al.

(10) Patent No.: US 8,879,187 B2
(45) Date of Patent: Nov. 4, 2014

(54) SELF-WRITING OF SERVO PATTERNS

(75) Inventors: Xin H. Yang, Fremont, CA (US); S. Craig Smith, Santa Clara, CA (US); Lin Guo, Saratoga, CA (US)

(73) Assignee: Seagate Technology LLC, Cupertino, CA (US)

( * ) Notice: Subject to any disclaimer, the term of this patent is extended or adjusted under 35 U.S.C. 154(b) by 1046 days.

(21) Appl. No.: 11/714,057

(22) Filed: Mar. 5, 2007

(65) Prior Publication Data

US 2007/0211369 A1    Sep. 13, 2007

Related U.S. Application Data

(60) Provisional application No. 60/779,554, filed on Mar. 6, 2006.

(51) Int. Cl.
*G11B 5/596* (2006.01)

(52) U.S. Cl.
CPC ........ *G11B 5/59666* (2013.01); *G11B 5/59688* (2013.01)
USPC .............................................. 360/55; 360/75

(58) Field of Classification Search
None
See application file for complete search history.

(56) References Cited

U.S. PATENT DOCUMENTS

| | | | |
|---|---|---|---|
| 5,483,438 A * | 1/1996 | Nishimura | 360/78.09 |
| 5,844,743 A * | 12/1998 | Funches | 360/78.04 |
| 6,236,895 B1 | 5/2001 | Romano et al. | |
| 6,459,990 B1 * | 10/2002 | McCall et al. | 701/220 |
| 6,771,443 B2 | 8/2004 | Szita et al. | |
| 6,898,035 B1 | 5/2005 | Chainer et al. | |
| 6,985,316 B1 | 1/2006 | Liikanen et al. | |
| 6,995,944 B1 * | 2/2006 | Takaishi et al. | 360/78.06 |
| 6,995,945 B2 * | 2/2006 | Kohso et al. | 360/78.09 |
| 7,088,533 B1 | 8/2006 | Shepherd et al. | |
| 2005/0031132 A1 * | 2/2005 | Browning et al. | 381/59 |

* cited by examiner

*Primary Examiner* — Wayne Young
*Assistant Examiner* — James L Habermehl
(74) *Attorney, Agent, or Firm* — HolzerIPLaw, PC

(57) ABSTRACT

Various embodiments of the present invention allow for the generation of at least one estimated value of a first parameter that is derived from a regularly measured value of a second parameter. In addition, a single control feedback signal can be adjusted via updating of the estimated and regularly measured values in a control feedback loop. At least one spiral track can be written to storage media based on the single control feedback signal, where the single control feedback signal can be received from an compensating circuit that receives the at least one estimated value of the first parameter, which can refer to position, and the at least one regularly measured value, which can refer to velocity.

19 Claims, 4 Drawing Sheets

SELF-WRITING OF SERVO PATTERNS

CROSS-REFERENCE TO RELATED PATENT APPLICATIONS

This application claims priority from Provisional Application No. 60/779,554, filed Mar. 6, 2006, incorporated herein by reference in its entirety.

BACKGROUND

The present invention relates generally to the field of servo control systems. More particularly, the present invention relates to self-writing servo patterns within a storage device.

Various conventional techniques exist for writing servo data to storage device media, e.g., hard drive disk surfaces. One conventional approach to servo writing involves writing an entire servo pattern on a disk outside of a disk drive, where the writing is done on a servo track writer with write heads/circuitry and other disk drive electronics. The disk can then be installed in the disk drive. Another conventional approach, referred to as servo track writer-assisted servo writing, comprises installing unwritten disks in a disk drive, after which a servo track writer uses a clock head and pushpin actuator to assist the disk drive head/electronics to lay down an entire servo pattern. Yet another conventional method of servo writing can be referred to as servo track writer-assisted reference pattern writing, where unwritten disks are installed in a disk drive and a servo track writer assists the disk drive head/electronics in writing a spiral reference track. Thereafter, the disk drive completes the actual servo pattern writing in a test rack without the use of the servo track writer. In a variation of reference pattern writing, reference spirals can be written on a disk before the disk is installed in the disk drive on a servo track writer with write heads and electronics. Once the reference spirals have been laid down on the disk, the disk is installed in the disk drive and the disk drive itself completes the actual servo pattern writing in a test track, again without the servo track writer. Alternatively, servo track writing can be accomplished without the use of a servo track writer, where unwritten disks are installed in a disk drive and the disk drive writes its own spiral reference pattern based on a disk locked clock. Utilizing the fine control of a voice coil motor (VCM) implemented within the disk drive, the VCM can use the spiral reference pattern to write the remaining servo pattern.

However these processes are time consuming and cost intensive.

In addition, such conventional servo writing techniques use a high precision micro positioner (i.e., push-pin actuator) on the servo track writer. Depending on the number of reference spirals (i.e., reference pattern) being laid down, and the speed being used during the spiral write, there is a certain amount of process time imparted by the servo track writer. This process time becomes longer with higher tracks per inch (TPI) and higher sampling rate disks. A high process time leads to a high cost of equipment, as many systems are required to operate in parallel. Hence, writing reference spirals utilizing only a VCM, thereby removing the dependency on push-pin actuators and achieving significant equipment cost reduction is desirable.

The conventional servo writing approaches also require a longer velocity ramp up length (i.e., the stroke needed to ramp up speed) before a desired spiral velocity is reached, where the velocity ramp up length is limited by hardware (i.e., microE positioner). This translates to a loss of usable disk space and implies that a higher TPI is needed to retain a desired capacity design point. This could potentially prohibit the use of spiral servo writing technology on smaller form factor disk drives.

Lastly, although certain reference pattern write processes can be accomplished in part by utilizing a VCM, it would be desirable to control VCM motion in a radial direction in a precise and repeatable manner, so that reference spirals written onto the media (i.e., disk surface) would have satisfactory spacing accuracy, provided that tangential timing, spindle, or disk angular speed control is adequately accurate. However, it would be desirable to control VCM motion to achieve desired spiral velocity with satisfactory accuracy and repeatability over the entire media surface without servo track position information.

SUMMARY

Various embodiments of the present invention allow for the generation of at least one estimated value of a first parameter that is derived from a regularly measured value of a second parameter. In addition, a single control feedback signal can be adjusted via updating of the estimated and regularly measured values in a control feedback loop. At least one spiral track can be written to storage media based on the single control feedback signal, where the single control feedback signal can be received from an compensating circuit that receives the at least one estimated value of the first parameter, which can refer to position, and the at least one regularly measured value, which can refer to velocity.

One embodiment of the present invention provides a method of generating at least one estimated value of a first parameter from at least one regularly measured value of a second parameter, where the at least one estimated value of the first parameter is updated with at least one irregularly measured value of the second parameter. In addition, the method comprises adjusting an output of the control feedback loop utilizing the at least one updated, estimated value of the first parameter and the at least one regularly measured value of the second parameter.

Another embodiment of the present invention provides a method involving receiving a single control signal, wherein the single control signal is a function of a plurality of velocity data and a plurality of estimated position data. The method also involves writing at least one spiral track to a media in accordance with the single control signal.

Yet another embodiment of the present invention provides a system that comprises an estimating circuit configured to generate estimated position measurements derived as a function of the velocity measurements. In addition, the system comprises a compensating circuit configured to receive the estimated position measurements and the velocity measurements from the estimating circuit, and to generate a single control feedback loop output. Lastly, the system comprises writing circuitry configured to write at least one spiral track onto a disk media based upon the single control feedback loop output received from the compensating circuit.

DETAILED DESCRIPTION OF THE PREFERRED EMBODIMENTS

Figure 1:
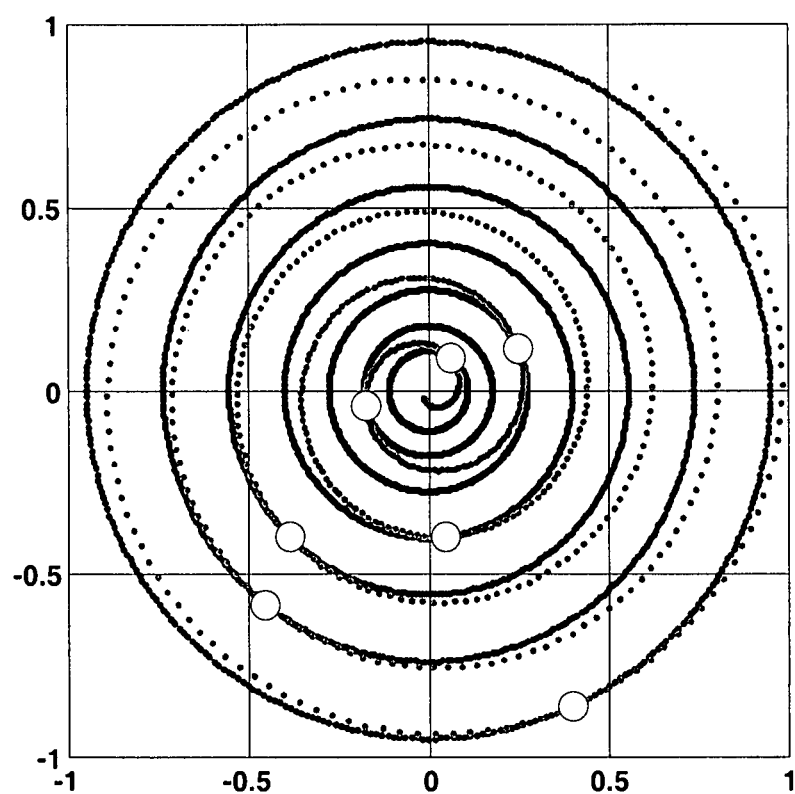
FIG. 1 shows a diagrammatic representation of circumferential reference tracks and spiral tracks to be written on a disk in accordance with the various embodiments of the present invention.

The present invention allows for the design and implementation of a VCM compensator that uses mixed and irregular rates of measurements on position (from read head signal demodulation of special patterns laid on the disk) and velocity (from the measurement of a back electromagnetic field (BEMF) of a VCM coil) of the VCM during a spiral track write process. The invention is generically applicable to any system that will synthesize a control action based upon a combination of regularly and irregularly (in time) spaced measurements. This is accomplished through the use of an estimator that handles irregular measurements by generating corresponding regular estimates. This idea has been applied to a servo loop on a hard drive assembly (HDA) VCM system to write at least one set of spiral tracks on a disk. Test data has shown that a compensator designed in accordance with this method is capable of handling a situation where a velocity signal is measured at a regular sample rate, yet a position signal is measured at an irregular and much lower sample rate, while still achieving satisfactory spiral spacing accuracy. It should be noted that the various embodiments of the present invention can also be utilized as a type of enabler for in-drive servo data writing systems.

The various embodiments of the present invention provide a compensating circuit, such as a VCM compensator to perform in-drive spiral track writing with an interim reference pattern. More specifically, the VCM compensator handles mixed and varying sample rates in a multi-input-single-output (MISO) VCM compensator. The various embodiments of the present invention also include a method of constructing an estimated position signal at a regular sample rate as a substitute for actual measurements. Such a method is useful when a true position signal is unavailable, thereby bypassing the difficulty of handling the mixed and irregular sample rate, and instead merely having to address an issue of estimated signals determined at a uniform sample rate. In one embodiment of the present invention, the compensator can be applied to reading concentric, circumferential reference tracks that take the form of sine waves of a fixed frequency.

The MISO VCM compensator constructed in accordance with the various embodiments of the present invention operates in the context of the following servo write process:

1) A form of reference pattern is laid down on a media, i.e., disk. One example of this reference pattern could be a constant frequency sine wave signal written at a certain radius of the disk, as described above. Such a reference pattern can be laid down by a servo track writer or by other appropriate devices, e.g., a media certifier. It should be noted that the reference pattern can be laid down at a constant interval or at a non-constant interval more quickly than by writing a spiral reference pattern.

2) With such a reference pattern in place, spiral tracks are laid down by moving an actuator at a constant speed. Alternatively, the spiral tracks can be laid down in accordance with a variety of other velocity profiles. This can be performed in-drive with drive electronics and an actuator control system, which can include a VCM.

3) The reference pattern is used as a reference point to regulate speed. A position signal is decoded when a head, e.g., a transducer head, moves across the various portions of the reference pattern. In addition, a velocity control loop is formed by using estimated position and/or velocity values. Estimated position and/or velocity values are derived from an estimator (e.g., a current estimator or a predictor estimator). The velocity control loop is closed with a reference position signal and a BEMF signal, where the BEMF signal (indicating velocity) is available at a high sampling interval while the reference position signal is available at a much lower sampling interval.

After a desired number of spiral tracks are laid down, the HDA proceeds with any remaining operations of the final spiral write process (e.g., pushing off to spiral, fill hsector in temporary utility area, fill remaining portions of the disk, etc. In other words, the various embodiments of the present invention can be utilized to lay down "intermediate" spiral tracks before final spiral and/or other track paths are written.

In accordance with the context described above, the VCM compensator utilizes two basic assumptions. The first assumption (A) is that the measurement of VCM velocity by the BEMF of the VCM is available, and can be acquired at regular sample rate. The second assumption (B) is that reference tracks comprising the reference pattern have been written across the blank media. It should be noted that these reference tracks are not required to be written down on the blank media with accuracy, but simply need to be there.

It should further be noted that the first assumption (A) is reasonable since the VCM BEMF has been used in conventional hard drive disks for Load-Unload processes. In addition, a simple reference track that supports the second assumption (B) is provided with a diagrammatic representation of a media surface shown in FIG. 1. The interim reference tracks can laid down on the blank media in various forms. One possible form is configured as approximately twelve circumferential reference tracks with different radii, where the accuracy of the radius of each circumferential reference track is not required. Alternatively, reference tracks can be embodied using other appropriate configurations, including but not limited to parallel lines, eccentric circles, and spirals, as long as reference marks exist in known locations and a magnetic transducer can be used to identify when a read head is above/proximate to such locations, FIG. 1 also shows a spiral track 100, denoted by a dotted line, laid down on the media in accordance with the various embodiments of the present invention. In addition, seven circumferential reference tracks 110 laid down previous to laying down the spiral track 100 are shown, where the circumferential reference tracks 110 have uneven spacing between them. It should be noted that although one embodiment, as described above, utilizes twelve circumferential reference tracks, the use of seven circumferential reference tracks is possible. That is, the number of circumferential reference tracks utilized in writing the spiral need only provide enough reference measurements, discussed below in greater detail, to achieve a desired accuracy in the placement of the spiral track. In one embodiment, the spiral track 100 crosses circumferential reference tracks 110 seven times as indicated by points 120-126. The specific time instances at which the spiral track 100 crosses circumferential reference tracks 110 are represented by sample number values 60, 106, 170, 254, 357, 479, and 620. The time duration between the adjacent crossings are 46, 64, 103, 122, and 141, respectively. This is an example of varying spacing between each adjacent pair of circumferential reference tracks 110.

Figure 2:
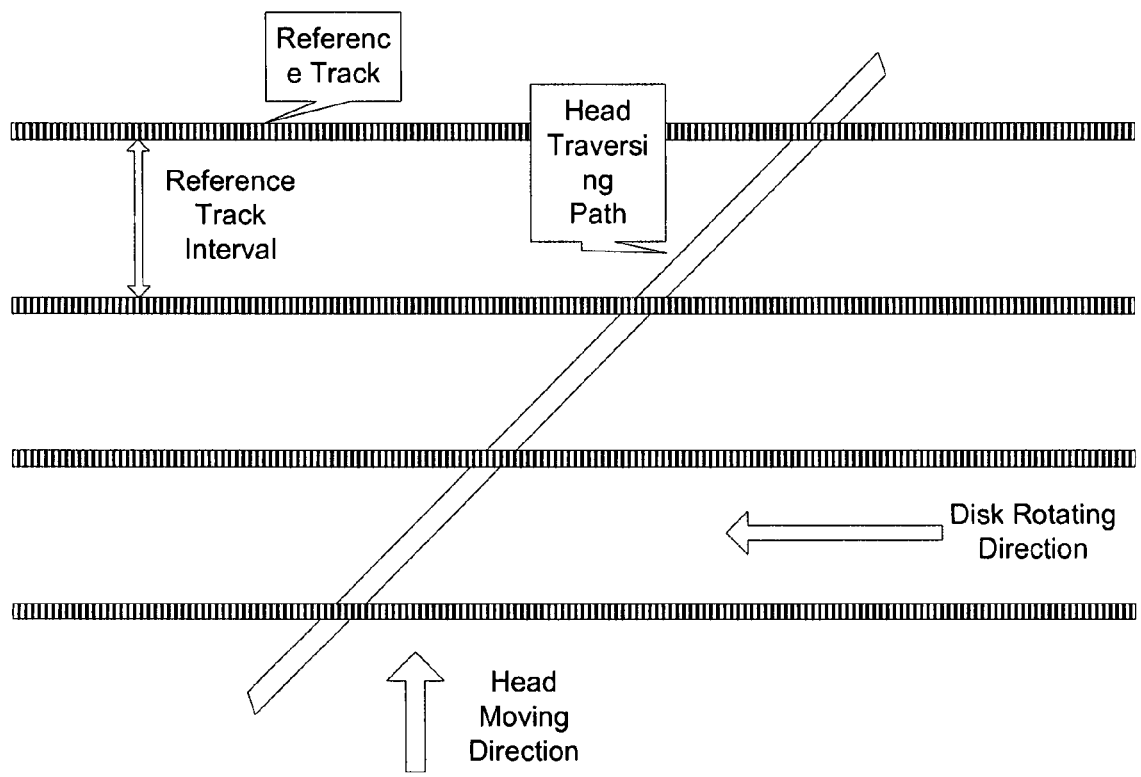
FIG. 2 shows a close-up view of a plurality of circumferential reference tracks and a spiral track written on a disk in accordance with one embodiment of the present invention.

FIG. 2 shows a close-up view of the concentric, circumferential reference tracks 110 depicted in FIG. 1. In addition, FIG. 2 illustrates a head traversing path, e.g., a transducer head, representative of the spiral track 100 that is to be written based on the circumferential reference tracks 110. As the media, i.e., disk, rotates in one direction shown by a first arrow 150, the transducer head moves in a direction that allows the transducer head to substantially sweep across the circumferential reference tracks 110 in a generally radial direction shown by a second arrow 160. In addition, as the spiral track 100 is being written, the VCM which controls the movement of the transducer head, is adjusting the positioning of the transducer head to ensure proper writing of the spiral track 100, thus resulting in a closed feedback control loop, described in greater detail below.

Figure 3:
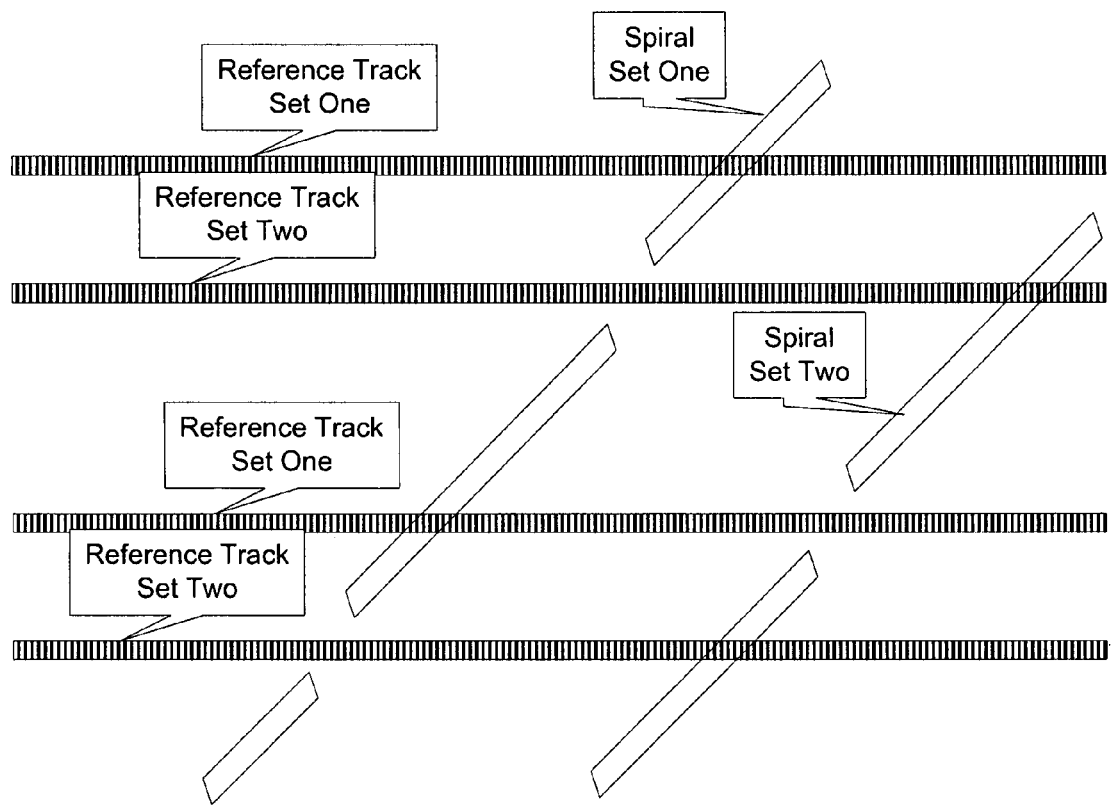
FIG. 3 shows a close-up view of a plurality of circumferential reference track sets and a plurality of spiral track sets written on a disk in accordance with a second embodiment of the present invention.

In an alternative embodiment, multiple sets of circumferential reference tracks and spiral tracks are provided. Multiple sets of circumferential reference tracks address a problem of "broken spirals". This problem occurs during the reading and decoding of the circumferential reference track information, where a write process may have to stop, resulting in discontinuous spiral tracks. To counteract this problem, two sets of circumferential reference tracks 110 and 170 and are laid down using, for example, a servo track writer, as shown in FIG. 3. When writing the spiral tracks, two sets of spiral tracks 100 and 180 are laid down on the media. The first set of spiral tracks 100 is written in accordance with the first circumferential reference track set 110, and the second set of spiral tracks 180 is written in accordance with the second reference track set 170. The two sets of circumferential reference tracks 110 and 170 are properly laid down with a certain radius relative to each other so that a spiral track switch can be performed during an hsector fill process to guarantee that the hsectors can be filled by laying down a "non-broken" set of spirals.

It should be noted that the spiral tracks 100 and 180 are written according to a lower frequency, for example, ½ of the frequency associated with the writing of the corresponding reference tracks. Utilizing a lower frequency when writing the spiral tracks substantially ensures that the spiral tracks 100 and 180 can be detected properly even when the transducer head is sitting on a spiral track, e.g., spiral track 180, with a full circumferential reference track readback pattern. In other words, while serving at a constant radius, where a reference track is present, the transducer head can determine a difference between the reference track pattern and the pattern of a spiral track written over that reference track. Hence, it is not necessary for the reference tracks to be used during later efforts to control a head at a particular radial location. This is accomplished by filtering a signal received from the full circumferential reference track readback pattern through, for example, a Low Pass Filter and an N-tap Band Rejection Filter. It should be noted that the hsector fill process described herein is provided merely as a point of reference indicating one of more processes that occur after the spiral tracks have been written. Therefore, the various embodiments of the present invention do not necessarily require an hsector fill process to be executed.

Based on the assumptions discussed above, the VCM compensator is designed to receive two inputs, i.e., VCM velocity (by BEMF measurement) and reference track position (by read head, e.g., transducer head, signal detection). In addition, the VCM compensator is designed to have one output, i.e., a VCM digital-to-analog (DAC) value. Hence a multi-input-single-output compensator (MISO) design in accordance with the various embodiments of the present invention receives:

(A) Regular measurements of BEMF signal for VCM velocity at every sample instance; and (B) Sporadic measurements of circumferential reference tracks position on the media (detected by the read head) at a much lower and irregular sample rate.

Referring back to FIG. 1, circumferential reference tracks 110 position relative to the spiral track 100 is represented by the sample number values 60, 106, 170, 254, 357, 479, represented by points 120-126, respectively. That is, the position of the transducer head during the writing of the spiral track 100 is known even if the circumferential reference tracks 110 are not accurately written according to a constant radii, as previously noted.

Given the two inputs (i.e., regularly sampled BEMF measurements and irregularly and sparsely sampled reference track position measurements), the VCM compensator design, as described above results in a two-input-one-output VCM compensator to maximize the VCM motion repeatability when following a desired velocity profile during a final spiral writing process.

Certain challenges arise when designing a VCM compensator in accordance with the various embodiments of the present invention. A first issue to address is that the sampling rates are different for the two inputs into the VCM compensator. In particular, a sampling rate for VCM position measurement (based upon measurements made using the circumferential reference tracks 110) is much lower than a sampling rate for VCM velocity/BEMF. In fact, the sampling rates can differ by factors ranging between approximately 10 times to as much as 100 times. A second issue to address is that the sampling rate of the circumferential reference tracks position measurement is not fixed because, as described above, it is not a requirement in the various embodiments of the present invention to write circumferential reference tracks that are evenly and precisely spaced in the radial direction.

Multi-rate control theory applies only when sample rates are regularly related. Therefore, at present, no standard design methodology exists within classical modern control theory that is able to manage mixed and varying sample rate measurements. As a result, a method of designing and implementing the various embodiments of the present invention in accordance with the context of operation, assumptions, and techniques for addressing the challenges outlined above are described below. In addition, it should be noted that although application of the design and implementation methods described herein are presented with regard to hard disk drive systems, such methods could be applicable to other control systems where it would be advantageous to manage mixed and varying sample rate measurements.

As described above, the VCM adjusts the positioning of the transducer head during the writing of the spiral track 100 utilizing a closed feedback control loop. In order to effectuate the closed feedback control loop, the various embodiments of the present invention utilize an estimator, implemented for example, as a circuit, configured to generate estimated position and velocity measurements at sample instances to be used by the VCM to control the adjusting of the positioning of the transducer head. According to one embodiment of the present invention, at a time instant [k], the estimator generates position signals p[k] and velocity signals v[k] as follows:

$$v[k] = \text{vel\_measurement}[k]$$

$$p[k] = \begin{cases} p[k-1] + T*v[k] & \text{without measurement, } T = \text{sample time} \\ \text{pos\_meas}[k] & \text{when there is a measurement} \end{cases}$$

In this example, the estimated velocity is the measured velocity, and the estimated position is reset to a measured position whenever a measured position is available. Otherwise, the estimated position is the integration of the measured velocity when a true position measurement is unavailable. Estimating velocity and position in such a manner is possible because the positioning of the VCM effectively translates into the position of the transducer head. Therefore, as the VCM moves, the transducer head moves with the same angular displacement and velocity. In addition, regular velocity measurements of the VCM are readily available in the form of BEMF measurements which can be regularly sampled.

For example, BEMF measurements can be taken at specific times as the transducer head moves from an inner diameter of the disk, upon which the spiral track 100 is being written to an outer diameter of the disk. It should be noted that the transducer head can also move from the outer diameter of the disk to the inner diameter of the disk. Using this manner of taking BEMF measurements can result, for example, in 1000 velocity measurements. However, as described above, position measurements are more sporadic as they are taken relative to a small number of circumferential reference tracks 110, e.g., twelve. In addition, the radial distance between each of the circumferential reference tracks 110 may be non-constant and/or unknown, hence the need to estimate position measurements when none are available at a particular sample time or period. Therefore, when a position measurement is available, for example, at a point where the spiral track 100/transducer head crosses a circumferential reference track 110, that position measurement is used to update or reset the position measurement estimated using regular velocity measurements.

More specifically, the estimator is made up of at least a plant and a, state observer, where the state observer can be though of as an extension of a state space model which can provide feedback to a control system, such as that discussed herein. The state observer can be used to estimate signals, for example, position measurements, that cannot be directly measured. Therefore, the state observer can be used to estimate the position of the VCM to provide full state access for feedback control. In addition, a conventional control system is made up of a plant and a controller, where the plant refers to that part of the control system to be controlled.

In the various embodiments of the present invention, the VCM is the plant. Therefore, a discrete time state space equation can be used to mathematically represent the VCM as follows, where a regular sample time or period is denoted as T:

$$x(k+1) = Ax(k) + Bu(k)$$

$$y(k) = Cx(k) \tag{1}$$

In the equation (1) above, x(k) and y(k) represent the state and measured output, respectively at time instance t=kT. In particular, without a loss of generality it can be assumed that a measured output of plant y(k) is $$y(k) = \begin{bmatrix} y_1(k) \\ y_2(k) \end{bmatrix} = \begin{bmatrix} \text{position} \\ \text{velocity} \end{bmatrix}$$

A discrete time state space model that can be used to represent the state observer can be as follows:

Denoting z(k) and $\bar{y}$(k) as a counterpart of the state observer in discrete time form, the equation for representing a standard prediction state observer can be $$z(k+1) = Az(k) + Bu(k) + L(y(k) - \bar{y}(k))$$

$$\bar{y}(k) = Cz(k) \tag{2}$$

In the equation (2) above, a matrix L can represent the state observer gain, and for the same reason, the output of the state observer $\bar{y}$(k) can be $$\bar{y}(k) = \begin{bmatrix} \bar{y}_1(k) \\ \bar{y}_2(k) \end{bmatrix} = \begin{bmatrix} \text{estimated position} \\ \text{estimated velocity} \end{bmatrix}$$

Feedback control and estimation error dynamics are also considered. When feedback control law is used, the output of the state observer is fed back to the input of both the state observer and the plant. Therefore, u(k)=−Kx(k), where upper case variable K denotes feedback gain matrix, such that (A−KB) is asymptotically stable, or has all of its eigenvalues inside the unit circle. However, the state x(k) is not directly available, hence estimator state z(k) is used instead for the feedback control, i.e. u(k)=−Kz(k). As a result, equations (1) and (2) become $$x(k+1) = Ax(k) - BKz(k) \; z(k+1) = (A-BK)z(k) + L(y(k) - \bar{y}(k))$$

and $$y(k) = Cx(k) \; \bar{y}(k) = Cz(k)$$

In general, z(k)≠x(k), and therefore the estimation error is defined as e(k)=x(k)−z(k). Thus, simple algebra yields the following equation:

$$e(k+1) = (A-LC)e(k) \tag{3}$$

It is clear that by choosing the observer gain matrix L such that matrix (A−LC) is asymptotically stable (i.e., has all of its eigenvalues inside the unit circle), it is guaranteed that the estimation error e(k)=x(k)−z(k) converges to zero from any given initial estimation error e(0)=x(0)−z(0).

In order to use equations (1) and (2) together with the feedback law u(k)=−Kz(k), it is required that output measurement y(k) is available at every k, i.e., at each sample instance t=kT. However, as already discussed, position measurements are only available at sparse sample time instances, where intervals between each position measurement are not regular.

Therefore, it can be assumed that the time in which a VCM stroke takes to write a spiral track is NT, where N is a large positive integer, and T is the sampling time or period. Given that position measurements are only possible at a small number of sample instances, e.g., M sample instances, a position signal can be measured at time instances $T_m = \{T_1, T_2, \ldots, T_M\}$, where M is much smaller than N. Referring back to the example illustrated in FIG. 1, N is approximately 700 and M is 7. Each sample time instance is $\{T_1=60T, T_2=106T, T_3=170T, T_4=254T, T_5=357T, T_6=479T, T_7=620T\}$. It should also be noted that position measurements are separated respectively by {46, 64, 84, 103, 122, 141} sample periods.

Because VCM velocity/BEMF signals are measured at a regular sample rate, such a measurement at sample instance t=kT can be denoted as $v_{BEMF}(k)$. An estimated position signal can then be constructed from these measurements, where position can be denoted as $p_{BEMF}(k)=f(v_{BEMF}(k))$, i.e., a function of $v_{BEMF}(k)$. As described above, this function can be an integration function. According to one embodiment of the present invention, the integration function can be applied to a filtered $v_{BEMF}(k)$, resulting in the following equation:

$$p_{BEMF}(k) = \sum_{i=1}^{k} T\Phi(v_{BEMF}(i)) \qquad (4A)$$

In equation (4A), $\Phi(*)$ is the output of $v_{BEMF}(k)$ passing through a low pass filter.

According to another embodiment of the present invention, the integration function can be a simple integration of $v_{BEMF}(k)$, resulting in the following equation:

$$p_{BEMF}(k) = \sum_{i=1}^{k} Tv_{BEMF}(i) \qquad (4B)$$

It should be noted that in general, the VCM velocity/BEMF measurement is not exactly equal to the true velocity of the VCM. Therefore, the position measurement calculated above does not exactly match the true position of the transducer head. However, an exact match is not necessary for the purposes of calculating position measurements in accordance with the various embodiments of the present invention.

According to yet another embodiment of the present invention, a velocity signal can also be constructed from position measurements. Due to the fact that $L_{stroke}$, i.e., the whole stroke length of VCM, is known for any given design of an HDD, the stroke length is substantially the arc length that the VCM travels from "crash stop" to "ramp/crash stop." In addition, due to the fact that the desired VCM velocity profile can also be known, the position of the VCM/transducer head can be calculated/calibrated from the measurement of position signals. Therefore, position signal measurements can be represented as follows:

$$p_m = \{p(T_0), p(T_1), p(T_2), \ldots, p(T_M), p(T_{M+1})\} \qquad (5A)$$

The position $p_m$ is relative to the starting point position $p(T_0)=0$ (i.e., crash stop location) and the end point position (i.e., ramp/crash stop location) $p(T_{M+1})=L_{stroke}$, i.e. the whole stroke length. Given that position measurements are available, the derived velocity signals can be constructed from those position measurements utilizing various techniques, one example of which denotes velocity signals derived from position measurements as $v_{p,m}=\{v_{p,1}(T_1),v_{p,2}(T_2),\ldots,v_{p,M}(T_M)\}$. Therefore, one particular form of velocity signal construction is given below:

$$v_{p,m} = \frac{p(T_{m+1}) - p(T_m)}{T_{m+1} - T_m}; \quad m = 1, 2, \ldots M \qquad (5B)$$

It should be noted that other forms of velocity signal construction can be utilized by the various embodiments of the present invention.

Referring back to equation (2), the measured output y(k) of equation (1) is used as a real time update for the state observer, with a requirement that $\{y_1(k), y_2(k)\}$, or position and velocity both, are available at each regular sample instance. With the constructed velocity and position signals, a proposed state observer update law to resolve mixed and varying sample rate is given below:

$$y(k) = \begin{bmatrix} y_1(k) \\ y_2(k) \end{bmatrix} = S\Psi; \qquad (6A)$$

where at every m=1, 2, ..., M, k=1, 2, ... N, $\Psi$ and S are $$\Psi = \begin{bmatrix} p_m(T_m) \\ v_{p,m}(T_m) \\ p_{BEMF}(k) \\ v_{BEMF}(k) \end{bmatrix}, \qquad (6B)$$

$$S = \begin{cases} \begin{bmatrix} 1 & 0 & 0 & 0 \\ 0 & 1 & 0 & 0 \end{bmatrix}, & \text{if } kT = T_m \\ \begin{bmatrix} 0 & 0 & 1 & 0 \\ 0 & 0 & 0 & 1 \end{bmatrix}, & \text{if } kT \neq T_m \end{cases}$$

Alternatively:

$$y(k) = \begin{bmatrix} y_1(k) \\ y_2(k) \end{bmatrix} = \begin{cases} \begin{bmatrix} y_1 \\ y_2 \end{bmatrix} = \begin{cases} p_m(T_m) \\ v_{p,m}(T_m) \end{cases} & \text{if } kT = T_m \\ \begin{bmatrix} y_1 \\ y_2 \end{bmatrix} = \begin{cases} p_{BEMF}(k) \\ v_{BEMF}(k) \end{cases} & \text{if } kT \neq T_m \end{cases} \qquad (6C)$$

$$m = 1, 2, \cdots, M, k = 1, 2, \cdots, N$$

After constructing y(k) at each sampling instance from equation (2), as defined in equations (6A), (6B), and (6C), the state of the state observer z(k) is available at each sample instance, which is constructed mathematically, thereby achieving the ability to utilize mixed and varying sample rate measurements to effectuate feedback control.

It should be noted that neither the position measurements $p_m=\{p(T_0), p(T_1), p(T_2) \ldots, p(T_M), p(T_{M+1})\}$, nor the VCM velocity/BEMF measurements $v_{BEMF}(k)$, nor any of the raw measurements and their derived signals in $\Psi$ in Equation (6B), are directly used in a VCM compensator, described in greater detail below. Instead, the constructed output z(k) of the estimator is used in the feedback control law. It should also be noted that the observer gain matrix L can also be made to adapt to different forms of a matrix S, with a condition that (A−LC) is asymptotically stable.

In analyzing the state observer error dynamics in equation (3), it should be noted that when different sets of output measurements are used, e.g., plant output measurements taking the form of either $\{y_m(k), v_{p,m}(k)\}$, if $kT=T_m$, or $\{y_{BEMF}(k), v_{BEMF}(k)\}$, if $kT \neq T_m$, the error dynamics in equation (3) need to be re-evaluated for each case. However, if the norm of the measurement error (i.e., the difference between the measured output and true plant output) is bounded, then the norm of the estimation error is also bounded.

As described above, the constructed output z(k) of the estimator is input into a single sample rate MISO VCM compensator, where the MISO VCM compensator can be designed utilizing existing control system synthesis methodology, where the single sample rate can be the regular sample rate for VCM velocity/BEMF. Therefore, the MISO VCM compensator can receive two inputs (e.g., position and velocity measurements) and generate one output (e.g., VCM DAC counts). The MISO VCM compensator can be designed to follow a desired spiral velocity profile with consistency and robustness in the absence of true position measurement as well as irregular measurement of true position signal. In addition, the MISO VCM compensator can follow the desired spiral velocity profile in the presence of VCM velocity measurement noise, and in the presence of model mismatch from drive to drive.

Figure 4:
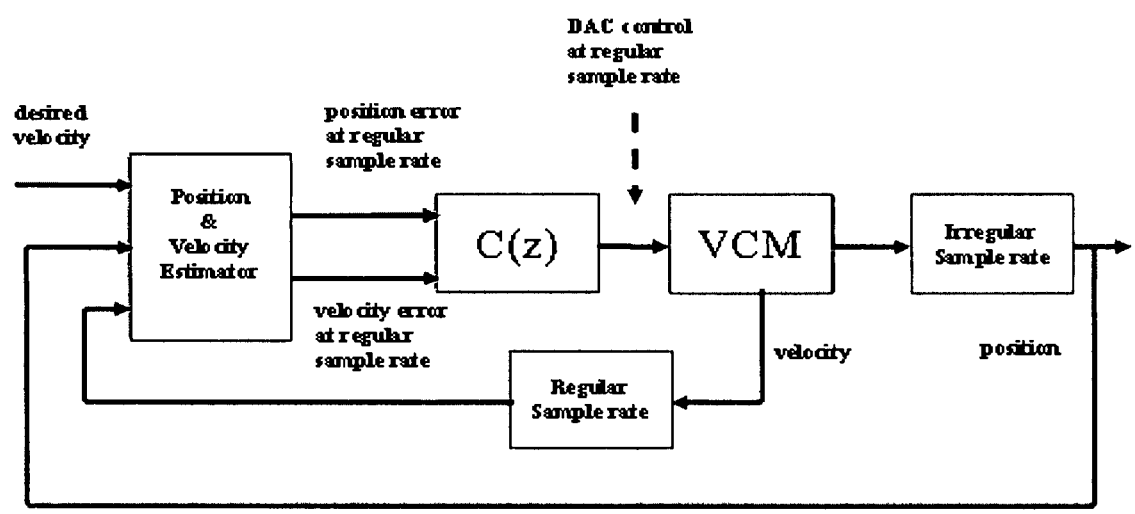
FIG. 4 shows a diagrammatic representation of a closed-loop estimator and compensator constructed in accordance with one embodiment of the present invention.

FIG. 4 shows a closed-loop implementation of an estimator 400 and a MISO VCM compensator C(z) 410. The estimator 400 and the MISO VCM compensator C(z) 410 are shown to receive regularly sampled VCM velocity/BEMF measurements 540 and irregularly sampled position measurements 430 from the VCM 420 to follow a desired velocity profile. As described in detail above, such measurements are utilized to generate position and velocity measurements for adjusting the position and/or velocity of the VCM 420 during the writing of a spiral track. As also explained above, the estimator 400 acts differently depending upon whether or not a true position measurement is available at a particular sample instance. It should be noted that the estimator 400 and the MISO VCM compensator C(z) 410 can be implemented in and including, but not limited to, a sample-and-hold DSP system. It should also be noted that the various embodiments of the present invention described herein can be applied to hard disk drives having a dual stage actuation architecture.

During the practical application of the various embodiments of the present invention, it has been shown that utilizing the VCM to lay down spiral tracks while being adjustable according to regular and irregular sample rate measurements related to velocity and position, respectively, is effective. In particular, when a maximum peak-to-peak Written-in-Runout (WRO) is compared to a maximum spiral-to-spiral spacing, the deviation between the two measurements does not exceed a satisfactory amount, where the satisfactory amount can refer to constraints on the relative placement of spirals associated with certain servo algorithms used to maintain radial position based upon a spiral pattern. It should be noted that WRO is an index used to measure how much each spiral at a particular revolution (i.e., one particular radius) deviates from its nominal (expected) position, and is a standard measurement index in certain conventional spiral writing processes.

In addition, when utilizing the VCM to lay down spirals in accordance with the various embodiments of the present invention, error bound size does not grow, where the error bound size refers to the percentage of spiral spacing growth. In addition, as described above, it is only necessary to lay down approximately 12 spirals. It is therefore clear that with sparse detection of reference tracks position, the radial position error, which directly translates into the final spiral spacing error, is tightly bounded. As a result, even though the number of final tracks on a media can number at least as much as 150,000 tracks, the various embodiments of the present invention require as little as seven circumferential reference tracks to be written on the media, resulting in significant savings with respect to cost, utilization of resources, manufacturing speed, and amount of remaining useable space on the media.

The circuits, devices, features and processes described herein are not exclusive of other circuits, devices, features and processes, and variations and additions may be implemented in accordance with the particular objectives to be achieved. For example, circuits as described herein may be integrated with other circuits not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

What is claimed is:

1. A method, comprising:
    generating at least one estimated value of a first parameter from at least one regularly measured value of a second parameter;
    updating the at least one estimated value of the first parameter with at least one of an irregularly measured value of the first parameter;
    and adjusting an output of a control feedback loop utilizing the at least one updated, estimated value of the first parameter and the at least one regularly measured value of the second parameter,
    wherein the updating of the at least one estimated value of the first parameter comprises resetting the at least one estimated value of the first parameter to the at least one irregularly measured value of the first parameter.

2. The method of claim 1, wherein the first parameter is a position measurement of a transducer head controlled by a voice coil motor relative to at least one reference track.

3. The method of claim 2, wherein the at least one reference track is written at a predetermined radius of a disk media at one of a constant and non-constant interval.

4. The method of claim 1, wherein the second parameter is an actual velocity measurement associated with a back electromotive force of the voice coil motor.

5. The method of claim 1, wherein the at least one irregularly measured value of the first parameter is determined at a first sampling rate, wherein the first sampling rate is substantially lower than a second sampling rate with which the at least one regularly measured value of the second parameter is determined.

6. The method of claim 1, wherein the updating of the at least one estimated value of the first parameter further comprises integrating the at least one regularly measured value of the second parameter as a function of time, wherein the time is indicative of at least one sample instance at which the at least one irregularly measured value of the first parameter is measured.

7. The method of claim 1, wherein the output of the control feedback loop controls movement of a voice coil motor.

8. The method of claim 7, wherein the adjusting of the output of the control feedback loop occurs concurrently with writing a reference pattern for subsequent writing of servo data executed by a read and write head operatively connected to the voice coil motor.

9. A method, comprising:
    receiving a single control signal, wherein the single control signal is a function of a plurality of velocity data and a plurality of estimated position data; and
    writing at least one spiral track to a media in accordance with the single control signal.

10. The method of claim 9, wherein the plurality of velocity data is determined by measuring at a first sampling rate, a back electromotive force associated with a voice coil motor configured to perform the writing of the at least one spiral track.

11. The method of claim 9, wherein the plurality of estimated position data is determined by applying an integration function to the plurality of velocity data, the plurality of velocity data being in one of a filtered and a non-filtered format.

12. The method of claim 11, wherein the integration function is further applied with regard to irregular sample instances at which at least a first value representative of the at least one spiral track coincides with at least a second value representative of at least one reference track already written on the media.

13. The method of claim 9, wherein the plurality of estimated position data is updated with a plurality of actual position data measured at irregular sample instances.

14. The method of claim 9, wherein the plurality of velocity data is constructed from the plurality of actual position data, the plurality of actual position data being measured relative to an inner diameter and outer diameter of the media.

15. A system, comprising:
   an estimating circuit configured to generate estimated position measurements derived as a function of velocity measurements;
   a compensating circuit configured to receive the estimated position measurements and the velocity measurements from the estimating circuit, and to generate a single control feedback loop output; and
   writing circuitry configured to self-write at least one spiral track onto a disk media based upon the single control feedback loop output received from the compensating circuit.

16. The system of claim 15, wherein a first set of the estimated position measurements are updated when at least one portion of the at least one spiral track crosses at least one portion of at least one reference track.

17. The system of claim 16, wherein the first set of the estimated position measurements are indicative of a first set of instances when the at least one portion of the at least one spiral track crosses the at least one portion of the at least one reference track occur at irregular intervals of time.

18. The system of claim 17, wherein a second set of the estimated position measurements are derived from the velocity measurements.

19. The method of claim 18, wherein the second set of the estimated position measurements are derived from the velocity measurements using an integration function, the velocity measurements being determined at regular intervals of time indicative of a second set of instances, wherein the second set of instances substantially outnumber the first set of instances.

* * * * *